Figure 1:
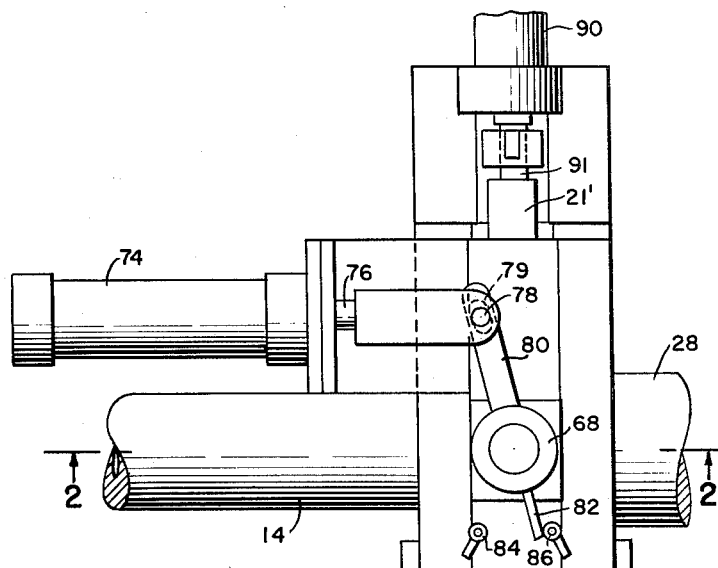

Aug. 25, 1964     S. S. SCHER     3,145,746

SCREEN CHANGING APPARATUS

Filed Feb. 25, 1963

INVENTOR
Stanford S. Scher
BY *Karl W. Flocks*
ATTORNEY

United States Patent Office 3,145,746
Patented Aug. 25, 1964

3,145,746
SCREEN CHANGING APPARATUS
Stanford S. Scher, Baltimore, Md., assignor to National Plastic Products Co., Inc., Odenton, Md., a corporation of Maryland
Filed Feb. 25, 1963, Ser. No. 260,503
5 Claims. (Cl. 146—174)

The present invention relates to a screen shifting device and more particularly to a device for moving a screen into and out of position in an extrusion machine or in a tube such as a conduit.

The present invention is an improvement over the device described in U.S. Patent No. 2,763,308 issued to Lee F. Samler on September 18, 1956.

The construction of an extrusion machine generally includes a strainer or screen which is positioned between the extruder die and screw. One of the purposes of the screen is to remove foreign particles from the extrudable materials before the die is reached thereby eliminating any possible defects in the finished extruded product. Another purpose of the screen is to create additional back pressure in the extruder thereby minimizing the normal pulsing of the screen. It has furthermore been found advantageous to employ a screen in the extruding device to break up the agglomerates of resin or filler in the material passing through the extruder thereby producing a more completely homogeneous mass for introduction into the die.

During the operation of the extruder it is necessary to change the extruder screen from time to time since the screen has a tendency to collect foreign matter rapidly. Unless the screen is changed at intervals its continued use will result in clogging and thereby cause the eventual shut-down of the extruder apparatus. Prior to Patent No. 2,763,308 it was necessary in order to change a screen for use in an extruding apparatus to completely shut-down the machine, remove the die and replace the screen. This operation not only resulted in a considerable loss of time and labor but moreover the overall production time of the machine was materially decreased.

Up to the present time however, the screen shifting devices in use have not operated sufficiently fast to minimize the shut-down time during the changing of the screen. It is therefore an object of the present invention to provide a screen shifting device which will minimize shut-down time necessary to change the screen.

It is another object of the present invention to reduce resultant scrap ensuing from changing a screen.

It is another object of the present invention to provide a simplified apparatus for screen shifting.

It is yet another object of the present invention to provide an apparatus which is less costly to build and is simple and fast to operate.

Figure 2:
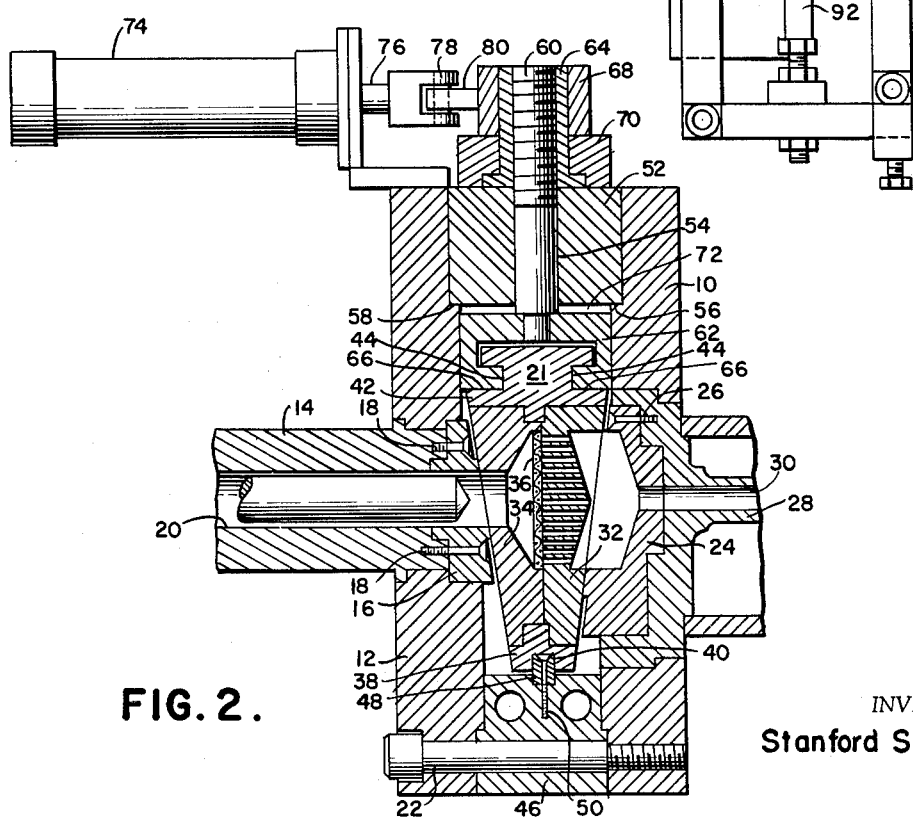

Other objects and the nature and advantages of the instant invention will be apparent from the following description taken in conjunction with the accompanying drawings, wherein:

FIG. 1 is a top view of the present invention, and
FIG. 2 is a vertical sectional view taken along lines 2—2 of FIG. 1.

Referring to the drawings, a screen housing assembly is shown in FIG. 2 and includes an elbow flange 10 and a cylinder flange 12. Adjacent cylinder flange 12 is a tubular neck section 14 of an extruder cylinder. Tubular neck section 14 interlocks with the cylinder flange 12 through a tapered cylinder insert 16 and screws 18. The extruder cylinder houses the usual extruder screw member which registers with the neck section 14 and a cylinder bore thereof communicates with bore 20 of the neck section 14.

The elbow flange 10 and cylinder flange 12 form a main body portion for the seating of a strainer screen pack frame indicated generally at 21. Elbow flange 10 and cylinder flange 12 are connected by stud bolts 22. Providing a downstream seat for the screen pack frame 21 and lying within elbow flange 10 is a tapered elbow insert 24. Adjacent elbow flange 10 and connected to tapered elbow insert 24 via screws 26 is a die attaching head member 28 which provides an escape bore 30 through which the filtered material passes. A wedge-shaped screen pack frame assembly seats in the wedge shaped opening formed by the tapered elbow insert 24 and tapered cylinder insert 16.

The wedge-shaped screen pack frame comprises two breaker plate cartridge members 32 and 34 which restrain a screen pack 36 and abut the tapered elbow insert 24 and tapered cylinder insert 16, respectively. At the narrow bottom of the wedge-shaped screen pack frame, a bottom wedge member 38 is provided; this bottom wedge member 38 contains a guide slot 40 at its lowermost surface defining the bottom of the wedge-shaped screen pack frame 21. The upper or wide end of the screen pack frame is defined by a pressure plate 42. Pressure plate 42 is shaped with two laterally extending under-cut groove portions 44 which permit the tapered screen pack frame 21 to be gripped for vertical unseating motion from the opening formed by the tapered cylinder insert 16 and tapered elbow insert 24.

Elbow flange 10 and cylinder flange 12 are separated at the bottom of the apparatus by a key support member 46 through which stud bolt 22 passes. The key support member 46 carries on its upper surface a bottom wedge guide key 48 which is attached to the key support member 46 by screw 50. The bottom wedge guide key 48 is complementary to and is received in a slot 40 in the bottom wedge member 38 of the wedge-shaped screen pack frame 21. The mating of bottom wedge guide key 48 and slot 40 insures proper seating of the tapered screen pack frame 21 within the wedge shaped opening formed between tapered cylinder insert 16 and tapered elbow insert 24.

At the upper end of the apparatus, elbow flange 10 and cylinder flange 12 are separated by a bar-rod support 52 which may be provided in the form of an annular or square shaped plug. Passing through the center of the bar-rod support 52 is a hole 54. The bar-rod support plug 52 is supported between the elbow flange 10 and cylinder flange 12 by shoulders 56 and 58, respectively, on flanges 10 and 12.

Passing through hole 54 of the bar-rod support 52 is the threaded lift bar-rod 60. Threaded lift bar-rod 60 is attached at its lower end to carrier lift bar 62 and at its top is threadedly engaged with an annular sleeve 64. The carrier lift bar 62 is provided with interlocking rib portions 66 which slidably engage and interlock with grooves 44 at the upper end of the pressure plate 42 of the wedge-shaped screen pack frame.

Suitably secured (such as by welding) about sleeve 64 is nut 68. Between the nut 68 and the bar-rod support plug 52 is a bearing member 70. A space 72 is provided between bar-rod support plug 52 and the carrier lift bar 62.

As shown in FIG. 1, as well as FIG. 2, operating means comprising a clamp-unclamp cylinder 74 is provided in the plane of rotation of nut 68. The clamp-unclamp cylinder 74 comprises a fluid pressure piston cylinder or solenoid operated assembly. Attached to a piston (not shown) and projecting from the cylinder 74 is piston rod 76, which is connected through a linkage including pivot pin 78 projecting through a lost motion slot 79 in a lever arm 80. The lever arm 80 is, in turn, fixedly connected to the nut 68. Projecting from the opposite side of the nut 68 is switch activating arm 82. Limit switches 84 and 86 are supported by suitable frame structure and during operation or rotation of the nut 68 are contacted by switch activating arm 82.

Adjacent the first wedge-shaped screen pack frame 21 is a second wedge-shaped screen pack frame 21' partly shown in FIG. 1. This second screen pack frame 21' is positioned in the same vertical and longitudinal planes as the first pack frame, but is normally positioned laterally in an inoperative position. Adjacent the second frame 21' is a push cylinder 90 and piston rod 91 of cylinder 90 contacts frame 21'. Adjacent the first tapered screen pack frame 21 and spaced a distance therefrom on the side opposite from frame 21', is a wedge locating stop 92. The frames 21, 21' are the same width and the stop 92 is located a distance equal to this width from the adjacent end of frame 21.

The operation of the device is as follows:

A suitable viscous material, which it is desired to have strained, is constantly forced through bore 20, through the inner bore of tapered cylinder insert 16 and into the interior of the tapered screen pack frame 21 where it is then forced through screen pack 36, through the inner bore of tapered elbow insert 24 and finally out bore 30. When screen pack 36 becomes clogged with filtered particles the pump or extruder on the inlet side of bore 20 then becomes overworked and material does not pass freely out of bore 30. However, to at this time stop operation of the pump or extruder would be costly from a production viewpoint. Therefore, it is desirable to change screen pack 36 without necessitating a long shut-down. Thus, when screen pack 36 becomes clogged, clamp-unclamp cylinder 74 is actuated causing piston rod 76 to be forced outwardly. This in turn causes nut 68 to be rotated by means of radially projecting lever arm 80 and pivot pin 78. Nut 68, as well as integral sleeve 64, which are vertically constrained, bear against bar-rod support 52 and bearing 70. Bar-rod support 52 in turn bears upon shoulders 56 and 58. Therefore, when nut 68 and sleeve 64 are rotated by the action of clamp-unclamp cylinder 74, this causes threaded lift bar-rod 60 to move upwardly and to take with it the attached carrier lift bar 62 which moves into space 72. Carrier lift bar 62 being slidably interlocked with the tapered screen pack frame via ribs 66 and grooves 44 thus carries the tapered screen pack frame upwardly and unseats it from the wedge-shaped opening formed by tapered cylinder insert 16 and tapered elbow insert 24. The frames 21, 21' will then be in end-to-end alignment.

In the meantime, the movement of clamp-unclamp cylinder 74 has caused switch activating arm 82 to contact limit switch 84. This in turn activates push cylinder 90 which exerts force against wedge-shaped screen pack frame 21' and thus forces the unseated first screen pack frame from carrier 62 and the wedge-shaped opening, and forces new tapered screen pack frame 21' into the wedge-shaped opening. This is accomplished by the transverse sliding of ribs 66 through grooves 44. When the first screen pack frame 21 containing clogged screen pack 36 contacts wedge locating stop 92 a limit switch therein causes the clamp-unclamp cylinder rod 76 to retract which thereby rotates nut 68 and sleeve 64 in the opposite direction forcing threaded lift bar rod 60, carrier lift bar 62 and the second screen pack frame 21' downwardly into seated position within the wedge shaped opening formed by tapered cylinder insert 16 and tapered elbow insert 24. Also when clamp-unclamp cylinder 74 is completely retracted, switch activating arm 82 contacts limit switch 86 (as shown in FIG. 1) and this limit switch causes push cylinder rod 91 to return to its normal position. The primary screen pack frame, now resting against stop 92, may be then unclamped and swung clear so that the screen pack frame can be removed and clogged screen pack 36 removed therefrom and a new screen pack put in. Thus when the tapered screen pack frame is serviced it can be placed adjacent to the push rod 91 of cylinder 90 when so desired and the cycle is then ready to be repeated.

The provision of fluid actuating means rather than mechanical actuating means, the use of limit switches to automatically control each sequence of the operation, and the single carrier means to unseat the tapered screen pack frame provide, not only the great reduction of shut-down time necessary to change screens, but also a reduction of scrap and wasted labor due to shut-down time required to manually change the screen.

In addition, the improved apparatus eliminates the operating cylinder and rack and gear mechanism for clamping and unclamping the wedge required in the prior art. Less attendant equipment is necessary and it is therefore less costly to build.

It will be obvious to those skilled in the art that various changes may be made without departing from the scope of the invention and therefore the invention is not limited to what is shown in the drawings and described in the specification but only as indicated in the appended claims.

What is claimed is:

1. An apparatus for changing screens comprising a body portion having a bore formed therein and a wedge-shaped opening in said body portion, a wedge-shaped screening frame seated in said wedge-shaped opening and a screen mounted in said frame and in communication with said bore, said frame comprising a pressure plate extending in a direction transverse to the axis of said bore with the extremity of said pressure plate being T-shaped in cross section, means for unseating said wedge-shaped frame and said screen therein from the wedge-shaped opening of said body portion including means operatively positioned in said apparatus for moving said wedge-shaped frame in a direction transverse to said bore and towards the wide end of said wedge-shaped opening, said moving means comprising an undercut carrier block slidably engaging the head of said T-shaped pressure plate and a single screw means for reciprocating said undercut block in said direction transverse to said bore to move said frame towards the wide end of said wedge-shaped opening, and automatic means for ejecting said screen and frame upon unseating from said body portion and simultaneously inserting a replacement screen and frame.

2. A device in accordance with claim 1 wherein said single screw means for reciprocating said screen and frame comprises a threaded lift rod connected with said undercut carrier block and, a sleeve threaded on said lift rod, and said unseating means further comprises a piston rod associated with said threaded sleeve so that upon movement of said piston rod said sleeve will rotate causing said lift rod and carrier to move and unseat said screen and frame.

3. An apparatus in accordance with claim 2 wherein said means for unseating said wedge-shaped frame and screen further comprises a fluid-actuated piston for said piston rod and a lever arm having a lost-motion slot for translating the linear motion of said piston rod to the rotary motion of said threaded sleeve.

4. An apparatus in accordance with claim 2 wherein said sleeve carries a switch activating arm, and wherein said automatic means for ejecting said screen and frame comprises a first limit switch normally out of contact with said activating arm while said frame is seated in said wedge-shaped opening and contacting said activating arm upon rotation of said sleeve, a push cylinder having a movable piston for sliding the replacement screen and frame along said undercut carrier block to force said first mentioned screen and frame out of registry with said wedge-shaped opening and said replacement frame into said registry, contact of said first limit switch effecting movement of said push cylinder piston, a second limit switch spaced a distance equal to the width of said frame beyond said wedge-shaped opening opposite from said push cylinder to cause, upon contact of said first mentioned frame, re-rotation of said sleeve to seat said replacement frame in said wedge-shaped opening, and a third limit switch normally in contact with said activating arm for effecting retraction of said movable piston in said push cylinder.

5. An apparatus in accordance with claim 1 wherein said wedge-shaped frame is disposed with the wide end facing upwardly, said T-shaped plate being at the wide end of said frame, and said frame having a transverse guide slot at its lower narrow end extending the width of said frame, and wherein said apparatus further comprises a guide key projecting upwardly into said guide slot in sliding relationship thereto.

References Cited in the file of this patent

UNITED STATES PATENTS

| | | |
|---|---|---|
| 1,195,576 | Garrahan | Aug. 22, 1916 |
| 2,786,504 | Samler | Mar. 26, 1957 |
| 2,838,084 | Samler | June 10, 1958 |